March 11, 1941. E. FITZNER 2,234,591
SELF-LOCKING DIFFERENTIAL MECHANISM
Filed Dec. 28, 1938
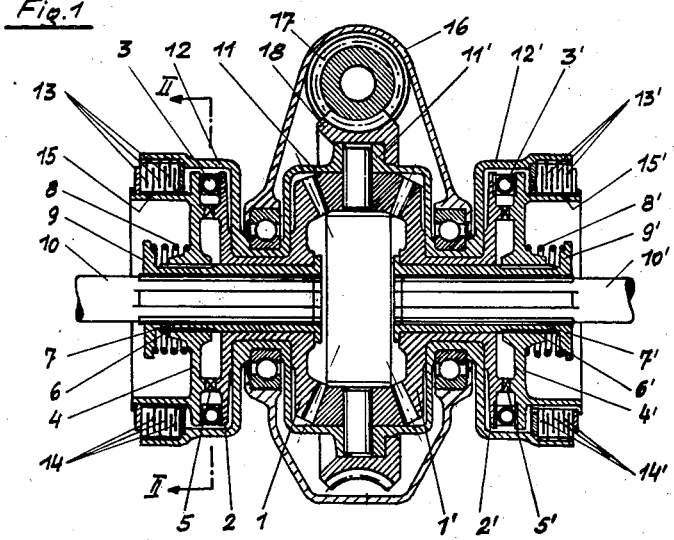
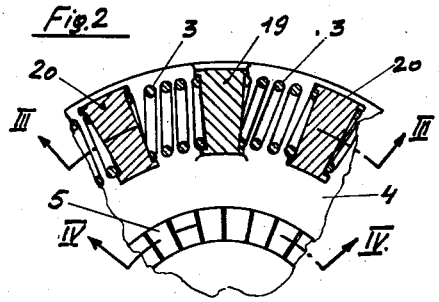
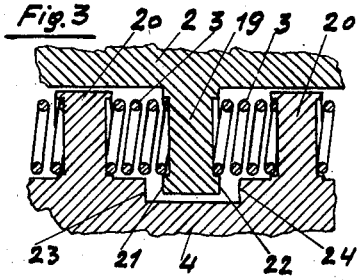
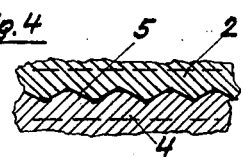
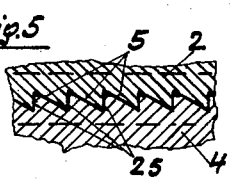
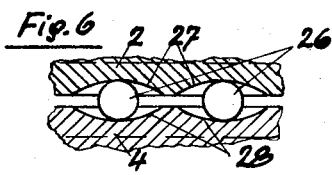
INVENTOR
Ernst Fitzner
BY
ATTORNEYS Patented Mar. 11, 1941

2,234,591

UNITED STATES PATENT OFFICE 2,234,591

SELF-LOCKING DIFFERENTIAL MECHANISM

Ernst Fitzner, Stuttgart-Wangen, Germany, assignor to Dr. ing. h. c. F. Porsche K.-G., Stuttgart-Zuffenhausen, Germany, a company of Germany Application December 28, 1938, Serial No. 248,061
In Germany January 26, 1938

12 Claims. (Cl. 74—315)

The present invention relates to improvements in self-locking differential mechanism particularly for power vehicles and it has for an object to improve such devices in which the internal friction is increased for the purpose of achieving the desired braking action.

Another object of the present invention is to provide for disabling means for the differential action dependent upon the partial torque delivered to the respective wheel driving shafts so that upon the elimination of the load upon such shaft its braking mechanism becomes effective for the purpose of locking the differential and upon the return of said partial torque the brake is again released. With such a construction the locking begins at the instant when a driving wheel loses its grip upon the ground and not only then when it has started to rotate as a result of losing its grip upon the ground. With such a construction the locking of the differential mechanism upon rounding a curve is prevented so long as both transverse shafts transmit a certain amount of torque.

It is another object to provide a construction in which shocks upon the driving mechanism are avoided as by connecting the wheel driving shafts elastically with respect to their driving wheels.

Another object is to utilize such elastic means for the purpose of actuating the differential locking mechanism.

According to the invention the relative movement permitted by the elastic member serves to actuate the differential locking device through operation of helical driving mechanism thus providing longitudinal movement relative to the transverse wheel driving shafts whereby the braking arrangement can be made exceptionally simple.

It is another object to provide such a construction in which the elastic members are arranged to transmit a part only of the maximum torque to be transmitted to its respective transverse shafts possibly one half or one fourth thereof, the balance being carried by an abutment which comes into action when the elastic members have been deformed.

It is another object to provide a particularly simple form of construction in which the elastic action is in the direction of the axis of the transverse wheel driving shafts.

Further objects and advantages of this invention will be apparent from consideration of the specification as illustrated by the accompanying drawing of possible embodiments of the invention, in which drawing:

Fig. 1 shows a vertical cross-sectional view of such a transmission;

Fig. 2 shows a partial vertical cross-sectional view along the line II—II of Fig. 1 upon a somewhat enlarged scale;

Fig. 3 represents a development along the line III—III of Fig. 2; and

Fig. 4 shows another development along the line IV—IV of Fig. 2; whereas

Figs. 5 and 6 show views similar to Fig. 4 but illustrating other modified forms.

Referring to Fig. 1, the transverse shaft driving gears 1, 1' are, through the connecting sleeve shown, connected with the disks 2, 2' which serve to rotate the disks 4 and 4' through the elastic members 3, 3' which, as shown have the form of helical springs (see also Fig. 2). Between the disks 2, 2' and 4, 4' are located the helical driving members 5, 5', attached or formed integrally with the disks 2, 2' and 4, 4' (see Fig. 4). The outer driving disks 4, 4' are coupled with the sleeves 7, 7' by means of the splined connections 6, 6'. Disks 4, 4' are normally pressed by means of coil springs 8, 8' which bear against the flange 9, 9' (of the sleeves 7, 7') and against the outer driving disks 4, 4' so that the helical drive members 5, 5' are constantly in interengagement as shown in Fig. 4. The sleeves 7, 7' drive the transverse shafts 10, 10' by means of the splined connection shown. The two halves 11, 11' of the rotating housing are connected with the coupling drums 12, 12' which are located outside of the housing 16 of the transmission drive mechanism and enclose the entire differential locking mechanism. With 12, 12' are connected the external clutch plates 13, 13' whereas the inner clutch plates 14, 14' are located upon the projection 15, 15' of the outer driving disks 4, 4'. The last mentioned parts comprise the differential locking clutch or coupling members.

If no torque is transmitted to the transverse shafts the springs 3, 3' and 8, 8' hold the coupling members in the engaged position so that a mechanical connection is in effect from the rotating housing 11, 11' to shafts 10 and 10'; by means of the gears 1, 1', the inner driving disks 2, 2', the elastic members 3, 3' to disks 4, 4' (and parallel thereto from the two halves 11, 11' of the rotating housing, the coupling drums 12, 12', the outer coupling plates 13, 13', the inner coupling plates 14, 14', and the projections 15, 15', to the said outer driving disk 4, 4') from which the power transmission goes over the splined connections 6, 6' to the sleeves 7, 7' which finally are rigidly connected with the side shafts 10, 10'. Now, if torque is transmitted to the side shafts 10, 10' the coil springs 3, 3' are first compressed (the play in the friction rings 13, 13' and 14, 14' and their mountings permitting sufficient movement for this purpose) so that the inner driving disks 2, 2' rotate with respect to the outer driving disks 4, 4' whereby the helical parts 5, 5' become effective to press the outer driving disks 4, 4' outwardly against the action of springs 8, 8', thus gradually relieving the coupling plates 13, 13' and 14, 14' so that the differential mechanism becomes free to operate. If now, for example, the left side is unloaded (as when the left driving wheel is in sand), the coil spring 3 serves to reversely rotate the outer driving disk 4 relative to disk 2 whereby through the helical parts 5 and the coil spring 8 the braking mechanism of the left side is made effective so that the shaft 10 is caused to rotate at the speed of the housing 11, 11', assuring that the shaft 10' and the wheel driven thereby will also rotate.

In the form of the invention shown, the elastic members consist essentially of the springs 3, 3' which are effective in a circumferential direction. Taking into consideration the power transmission ratios and the friction conditions with respect to the helical parts 5, 5' it will be seen that the coil springs 8 although working axially serve to assist said springs 3, 3'. Having this thought in mind, it is obvious that other forms of construction may be resorted to in which only one type of spring finds application which operates only in a rotary direction or only in an axial direction. Since only a small spring movement is necessary it is also possible to use leaf springs with advantage.

Fig. 2 shows how the elastic coupling between the transverse shaft gear 1 and the shaft 10 may be effected. The numeral 19 indicates a claw attached to the outer drive disk 4 which claw lies between the claws 20 of the inner driving disk 2 being held relative to the claws 20 by the spring members 3.

According to Fig. 3 the claw 19 is formed with surfaces 21 and 22 which after deformation of the coil spring 3 to the desired predetermined extent come to rest against the surface 23 or 24 of the outer driving disk 4 (depending upon the direction of rotation) and thereafter serve to provide for positive torque transmission.

In Fig. 4 the construction of the helical drive is indicated. It consists substantially in alternately left and right hand helical screw surfaces.

Fig. 5 shows another form of construction of the helical member for an arrangement in which the locking of the differential occurs continuously in one direction of rotation. In said direction of rotation, a positive driving coupling is effective through the surfaces 25 which comprise surfaces lying substantially in the longitudinal plane of the transmission, whereas for rotation in the opposite direction screw helical surfaces 5 are employed as in Fig. 4. It is, of course, obvious that with this form of construction the elastic members are provided only for elastic operation in one direction and the abutments, if present, are also supplied only for positive operation in one direction.

In Fig. 6 is shown a modification designed for operation in both directions of rotation and operating by means of an intermediate member. As intermediate member balls 26 are provided which operate upon the surfaces 27, 28 formed by depressions in the inner driving disk 2 and the outer driving disk 4, thus converting relative rotary motion of said disks into relative axial displacement.

The field of application of the invention is contemplated primarily as in power vehicles but the invention may be utilized in all cases in which locking of a differential mechanism is to occur upon the absence of load upon one side, which may occur, for example, in machine tools, and dividing or calculating machines; irrespective of what type the differential mechanism may take as, for example, whether it operates with bevel gears or spur gears. Other cases are contemplated in which the flow of power through the differential mechanism occurs in the reverse direction as where the power is applied through one or both of the transverse shafts. Further developments on the inventive concept are contemplated as, for example, its application to motor vehicles having independently sprung swinging half axles.

It will be noted that the constructions shown and described will serve admirably to accomplish the objects stated above. It is to be understood, however, that the constructions disclosed above are intended merely as illustrative of the invention and not as limiting as various modifications therein may be made without departing from the invention as defined by a proper interpretation of the claims which follow.

I claim:

1. In a differential mechanism for power vehicles or the like, the combination of a ring member, two power delivery shafts, differential mechanism for delivering power from said ring member to said shaft, coupling means for coupling said ring member to said shafts, which coupling means is normally effective, and means actuated by the application of torque as between the ring member and one of said shafts serving to disengage the coupling between said shaft and said ring member.

2. The combination according to claim 1 in which said coupling disabling means comprises an elastic driving member connected between said ring member and said shaft.

3. The combination according to claim 1 in which said coupling disabling means comprises an elastic driving member connected between said ring member and said shaft, and means actuated as an incident to the distortion of said elastic means to disengage said coupling.

4. The combination according to claim 1 in which said coupling disengaging means comprises an elastic driving member connected between said ring member and said shaft, and means actuated as the result of distortion of said elastic means to disable said coupling, said last mentioned means comprising two cooperating helical surfaces carried by the members between which said elastic member acts, so arranged that relative rotary movement of said members causes relative axial movement, and means actuated by said relative axial movement for disengaging said coupling.

5. In a differential mechanism for power vehicles or the like, the combination of a housing, a power applying ring member mounted for rotation therein, two power delivery shafts, differential mechanism for delivering power from said ring member to said shafts, normally effective coupling means for coupling said ring member to said shafts, and means actuated by the application of torque as between the ring member and one of said shafts serving to disable the coupling between said shaft and said ring member, said coupling means comprising generally cylindrical extensions connected to and rotating with said ring member and serving as housings for the other parts of said coupling means and for said coupling disabling means.

6. The combination according to claim 1 in which said coupling disengaging means comprises an elastic driving member connected between said ring member and said shaft and serving to transmit the entire torque applied to its respective shaft.

7. The combination according to claim 1 in which said coupling disengaging means comprises an elastic driving member connected between said ring member and said shaft, and abutment means so constructed and arranged as to become effective upon application of a predetermined amount of torque to said elastic member, which abutment means serve to transmit any torque in excess of said predetermined amount.

8. In a differential mechanism for power vehicles or the like, the combination of a ring member, two power delivery shafts, differential mechanism for delivering power from said ring member to said shafts, coupling means for coupling said ring member to said shafts for rotation therewith, which coupling means is normally effective, and means actuated by the application of torque in one direction only as between the ring member and one of said shafts serving to disengage the coupling between said shaft and said ring member.

9. The combination according to claim 1 in which said coupling disengaging means comprises an elastic driving member connected between said ring member and said shaft, and means actuated as the result of distortion of said elastic means to disengage said coupling, said last mentioned means comprising two cooperating helical surfaces carried by the members between which said elastic member acts, so arranged that relative rotary movement of said member in one direction only causes relative axial movement, and means actuated by said relative axial movement for disengaging said coupling.

10. In a differential mechanism for power vehicles or the like, the combination of a housing, a power applying ring member mounted for rotation therein, two power delivery shafts, differential mechanism for delivering power from said ring member to said shafts, normally effective coupling means for coupling said ring member to said shafts for rotation therewith, and means actuated by the application of torque as between the ring member and one of said shafts serving to disengage the coupling between said shaft and said ring member, said coupling means being located outside of said housing.

11. In a differential mechanism for power vehicles or the like, the combination of a housing, a power applying ring member mounted for rotation therein, two power delivery shafts, differential mechanism for delivering power from said ring member to said shafts, normally effective coupling means for coupling said ring member to said shafts, and means actuated by the application of torque as between the ring member and one of said shafts serving to disable the coupling between said shaft and said ring member, said coupling means being located outside of said housing and comprising generally cylindrical extensions connected to and rotating with said ring member and serving as housings for the other parts of said coupling means and for said coupling disabling means.

12. The combination according to claim 1 in which said coupling disabling means comprises an elastic driving member connected between said ring member and said shaft, and means actuated as the result of distortion of said elastic means to disable said coupling, said last mentioned means comprising two facing depressions in the members between which said elastic member acts, and intermediate rolling members located within said depressions, whereby relative rotary movement of said members causes relative axial movement, and means actuated by said relative axial movement for disabling said coupling.

ERNST FITZNER.